United States Patent [19]

Yamabe et al.

[11] Patent Number: 5,709,956
[45] Date of Patent: Jan. 20, 1998

[54] CO-EXTRUDED MULTILAYER LAMINATE

[75] Inventors: Ryoichi Yamabe; Tomoyuki Nara; Toshiyuki Narita, all of Shibukawa, Japan

[73] Assignee: Denki Kagaku Kogyo Kabushiki Kaisha, Tokyo, Japan

[21] Appl. No.: 503,611

[22] Filed: Jul. 18, 1995

[30] Foreign Application Priority Data

| | | | |
|---|---|---|---|
| Jul. 25, 1994 | [JP] | Japan | 6-172287 |
| Aug. 2, 1994 | [JP] | Japan | 6-181524 |
| Aug. 2, 1994 | [JP] | Japan | 6-181525 |

[51] Int. Cl.$^6$ ................................ B32B 27/28
[52] U.S. Cl. .............. 428/515; 428/519; 428/520; 428/66.4
[58] Field of Search ........................ 428/518, 517, 428/520, 522, 36.6, 492, 515, 519, 66.4, 521; 525/76, 86, 85, 192, 238, 239

[56] References Cited

U.S. PATENT DOCUMENTS

| | | | |
|---|---|---|---|
| 4,100,325 | 7/1978 | Summers et al. | 428/334 |
| 5,248,546 | 9/1993 | Greenlee | 428/212 |
| 5,283,286 | 2/1994 | Takahashi et al. | 525/75 |
| 5,424,363 | 6/1995 | Nagata et al. | 525/85 |

FOREIGN PATENT DOCUMENTS

| | | |
|---|---|---|
| 0-030-716 | 6/1981 | European Pat. Off. . |
| 66-011787 | 1/1987 | Japan . |
| 4-82034 | 12/1992 | Japan . |

*Primary Examiner*—Paul J. Thibodeau
*Assistant Examiner*—D. Lawrence Tarazano
*Attorney, Agent, or Firm*—Oblon, Spivak, McClelland, Maier & Neustadt, P.C.

[57] ABSTRACT

An extruded product comprising a rigid portion (1) and a flexible portion (2) which are co-extruded, wherein the rigid portion (1) is made of a resin or resin composition having a deflection temperature under load of from 80° to 120° C. as measured by JIS K 7207 A-method, and the flexible portion (2) is made of a resin composition comprising from 5 to 75 wt % of a vinyl chloride resin, from 5 to 70 wt % of a partially crosslinked acrylonitrile-butadiene copolymer and from 10 to 65 wt % of a plasticizer.

15 Claims, No Drawings

CO-EXTRUDED MULTILAYER LAMINATE

The present invention relates to an extruded product made of a synthetic resin excellent in heat resistance, moldability and deformation resistance.

Heretofore, a flexible synthetic resin such as a flexible vinyl chloride resin, or a crosslinked rubber material, has been used as a flexible material for sealing materials such as packings or gaskets for buildings, automobiles or kitchen equipments.

The flexible synthetic resin or the crosslinked rubber material may be used by itself in the form of an extruded, injection-molded or compression-molded product. Otherwise, the resin may be melted and integrated with a metal in the same co-extrusion die (hereinafter referred to as a die), or it may be bonded to a metal for use as a sealing material.

However, a sealing material prepared by co-extrusion of a metal and a resin, has been economically disadvantageous, since the resin and the metal have to be separated when the material is to be recycled.

To overcome this disadvantage, it has been studied to use a rigid synthetic resin instead of the metal for co-extrusion. A co-extruded sealing material in which a rigid synthetic resin is used, may be prepared, for example, by co-extruding the rigid synthetic resin and a flexible material, or bonding the rigid synthetic resin and a flexible material, followed by processing. As such a rigid synthetic resin, an ABS resin or a rigid vinyl chloride resin may, for example, be mentioned. However, the ABS resin is likely to form cracks when bonded or co-extruded with a flexible vinyl chloride resin and thus is not practically useful.

Therefore, a rigid vinyl chloride resin is usually employed as a rigid material to be co-extruded with a flexible material.

As a flexible material, a flexible vinyl chloride resin, an olefin resin or a rubber may, for example, be mentioned. However, in the case of co-extrusion, a flexible vinyl chloride resin is usually employed which is excellent in processability and heat fusion weldability to a rigid material.

Sealing materials thus obtained may be used for e.g. building, automobiles or kitchen equipments.

However, when such materials are used outdoors, their temperature may reach 70° C. or higher. Further, when such materials are used as interior parts of automobiles, the temperature in the interior of automobiles may reach as high as 90° C. at the maximum.

When a sealing material obtained by co-extrusion of a rigid vinyl chloride resin and a flexible vinyl chloride resin, is exposed under a high temperature atmosphere of 70° C., the rigid vinyl chloride resin will undergo a deformation, and the flexible vinyl chloride resin will also be susceptible to a deformation by a pressing pressure or compression, whereby the sealing and shielding effects tend to decrease during its use, and it is therefore not a sealing material having a good sealing performance.

If a gasket is prepared by using a heat resistant vinyl chloride resin as the rigid resin material in order to increase the heat resistance of the rigid material and a flexible vinyl chloride resin as the flexible material, the heat resistance of the rigid material can be improved, but it is still impossible to prevent a deformation under a high temperature atmosphere of the vinyl chloride resin which is used as the flexible material.

On the other hand, when a crosslinked rubber material is used as a flexible material, it will be possible to obtain a product which is excellent in deformation resistance and which has a good sealing property. However, its co-extruded product with a rigid synthetic resin has been hardly qualified as a useful product, since bonding is required due to the difference in the molding temperature between the rigid synthetic resin and the rubber material and due to the crosslinking treatment of the rubber portion.

Accordingly, it is an object of the present invention to solve the above problems and to provide an extruded product which has good heat resistance, moldability and deformation resistance and which is excellent in the sealing and shielding effects.

The present inventors have conducted extensive studies to prepare an extruded product using a thermoplastic resin composition as the rigid material and a flexible resin composition as the flexible material and as a result, have found it possible to obtain an extruded product excellent in the heat resistance, moldability and heat deformation resistance by using a resin or resin composition having a high heat deformation temperature as the rigid material and a resin composition comprising from 5 to 75 wt % of a vinyl chloride resin, from 5 to 70 wt % of a partially crosslinked acrylonitrile-butadiene copolymer and from 10 to 65 wt % of a plasticizer, as the flexible material, and co-extruding the rigid and flexible materials. The present invention has been accomplished on the basis of this discovery.

Thus, the present invention provides an extruded product comprising a rigid portion (1) and a flexible portion (2) which are co-extruded, wherein the rigid portion (1) is made of a resin or resin composition having a deflection temperature under load of from 80° to 120° C. as measured by JIS K 7207 A-method, and the flexible portion (2) is made of a resin composition comprising from 5 to 75 wt % of a vinyl chloride resin, from 5 to 70 wt % of a partially crosslinked acrylonitrile-butadiene copolymer and from 10 to 65 wt % of a plasticizer.

Now, the present invention will be described in detail with reference to the preferred embodiments.

The present invention provides an extruded product obtained by co-extruding a rigid portion (1) made of specific components and a flexible portion (2) made of specific components.

The rigid portion (1) is made of at least one resin or resin composition selected from the group consisting of the following (X) to (Z):

(X): A resin composition comprising from 90 to 10 wt % of component (a), from 0 to 80 wt % of component (b) and from 10 to 80 wt % of component (c)

(Y): A resin or resin composition comprising from 100 to 50 wt % of component (a) and from 0 to 50 wt % of component (b)

(Z): A resin composition comprising from 90 to 20 wt % of component (b) and from 10 to 80 wt % Of component (c).

Components (a) to (c) for the rigid portion (1) are as follows:

Component (a): A chlorinated vinyl chloride resin having a chlorine content of from 60 to 70 wt %

Component (b): A vinyl chloride resin

Component (c): A resin or resin composition comprising from 30 to 100 wt % of the following resin (A) and from 0 to 70 wt % of the following resin (B):

Resin (A): An α-methylstyrene copolymer comprising from 65 to 85 wt % of α-methylstyrene, from 15 to 35 wt % of a vinyl cyanide compound and from 0 to 20 wt % of other vinyl compound copolymerizable therewith Resin (B): A graft copolymer obtained by copolymerizing from 20 to 70 parts by weight of a mixture comprising from 50 to 80 wt % of an aromatic vinyl compound, from 15 to 35 wt % of a vinyl cyanide compound and from 0 to 30 wt % of other vinyl compound copolymerizable therewith, in the presence of from 30 to 80 parts by weight of a rubber having a glass transition temperature of not higher than 0° C.

The chlorinated vinyl chloride resin for component (a) to be used for the rigid portion can be prepared, for example, by chlorinating a vinyl chloride resin powder in a gas phase or in a state suspended in water or dissolved in a solvent. The chlorination method of a vinyl chloride resin is well known and is described in detail, for example, in Japanese Examined Patent Publications No. 888/1961 and No. 30833/1970.

The chlorine content of the chlorinated vinyl chloride resin to be used in the present invention is preferably from 60 to 70 wt %. If the chlorine content of the chlorinated vinyl chloride resin is less than 60 wt %, improvement of the heat resistance tends to be inadequate, and if it exceeds 70 wt %, the resin tends to be susceptible to heat decomposition, such being undesirable.

As examples of the vinyl chloride resin to be used for the preparation of the chlorinated vinyl chloride resin, not only a polyvinyl chloride, but also the one obtained by polymerizing a mixture of vinyl chloride with a vinyl compound copolymerizable therewith, by a conventional method such as suspension polymerization, bulk polymerization, fine suspension polymerization or emulsion polymerization, as well as an ethylene-vinyl acetate copolymer, an ethylene-ethyl acrylate copolymer or the one obtained by graft copolymerizing vinyl chloride to e.g. chlorinated polyethylene, may all be used. The degree of polymerization of the chlorinated vinyl chloride resin is preferably from 300 to 800, since if it is low, the impact resistance of the molded product thereby obtained tends to be low, and if it is high, the molding processability (fluidity) tends to decrease.

For the vinyl chloride resin to be used for the preparation of the chlorinated vinyl chloride resin, the vinyl compound co-polymerized with vinyl chloride includes, for example, vinyl esters such as vinyl acetate and vinyl propionate, acrylates such as methyl acrylate and butyl acrylate, methacrylates such as methyl methacrylate and ethyl methacrylate, maleates such as butyl maleate and diethyl maleate, fumarates such as dibutyl fumarate and diethyl fumarate, vinyl ethers such as vinyl methyl ether, vinyl butyl ether and vinyl octyl ether, vinyl cyanides such as acrylonitrile and methacrylonitrile, α-olefins such as ethylene, propylene and styrene, vinylidene halides and vinyl halides other than vinyl chloride, such as vinylidene chloride and vinyl bromide, and phthalates such as diallyl phthalate. Such a vinyl compound is used preferably within a range of at most 30 wt %, more preferably at most 20 wt %, in the constituting components of the vinyl chloride resin. Needless to say, the vinyl compound is not limited to the above-mentioned specific examples.

As examples of the vinyl chloride resin for component (b) to be used in the present invention, not only a polyvinyl chloride, but also a copolymer of vinyl chloride with the above described vinyl compound copolymerizable therewith, may be mentioned.

The amount of the vinyl compound to be used for such a vinyl chloride copolymer, is also preferably at most 30 wt %, more preferably at most 20 wt %, in the constituting components of the vinyl chloride resin.

The average degree of polymerization of the vinyl chloride resin is preferably from 500 to 1500, more preferably from 850 to 1400, as an average degree of polymerization (hereinafter referred to as a polymerization degree) as measured in accordance with JIS K 6721. If the polymerization degree is less than 500, the impact resistance tends to be poor, and if the polymerization degree exceeds 1500, the melt viscosity at the time of processing tends to be very high, whereby processing tends to be difficult.

Component (c) to be used for the rigid portion of the present invention is a resin or resin composition comprising from 30 to 100 wt % of resin (A) and from 0 to 70 wt % of resin (B).

Resin (A) is an α-methylstyrene copolymer comprising from 65 to 85 wt % of α-methylstyrene, from 15 to 35 wt % of a vinyl cyanide compound and from 0 to 20 wt % of other vinyl compound copolymerizable therewith.

As the vinyl cyanide compound, acrylonitrile, methacrylonitrile and α-chloroacrylonitrile may, for example, be mentioned. Particularly preferred are acrylonitrile and/or methacrylonitrile. The vinyl compound copolymerizable with the α-methylstyrene and the vinyl cyanide compound is preferably at least one member selected from various known vinyl compounds including, for example, styrene, vinyltoluene, t-butylstyrene, a halogen-substituted styrene, acenaphthylene, fumaronitrile, maleimide, maleic anhydride, N-substituted maleimide, methacrylic acid, acrylic acid, a methacrylate and an acrylate. Particularly preferred is styrene.

The method for preparing resin (A) is not particularly limited. For example, a method of aqueous emulsion polymerization may be employed. As a polymerization initiator in the aqueous emulsion polymerization, a persulfate such as potassium persulfate may, for example, be used.

As the emulsifier, sodium dodecylbenzenesulfonate or sodium stearate may, for example, be used. Further, additives which are commonly used, for example, a molecular weight controlling agent such as t-dodecylmercaptan, an emulsification-assisting agent such as sodium naphthalene sulfonate, and a lubricant such as a fatty acid amide, may be incorporated.

The temperature for the emulsion polymerization is preferably from 30° to 100° C., more preferably from 50° to 75° C.

The emulsion polymerization solution obtained by the above method may be solidified by a conventional means, for example, by a coagulant such as calcium chloride, followed by washing, dehydration and drying to obtain a polymer in the form of a white powder.

Resin (B) for component (c) is a graft copolymer obtained by copolymerizing from 20 to 70 parts by weight of a mixture comprising from 50 to 80 wt % of an aromatic vinyl compound, from 15 to 35 wt % of a vinyl cyanide compound and from 0 to 30 wt % of other vinyl compound copolymerizable therewith, in the presence of from 80 to 30 parts by weight of a rubber having a glass transition temperature of not higher than 0° C.

As the aromatic vinyl compound to be used for the preparation of the graft copolymer of resin (B), the above-mentioned styrene, α-methylstyrene, vinyltoluene, t-butylstyrene, a halogen-substituted styrene and a mixture thereof may, for example, be mentioned. Particularly preferred is styrene.

As the vinyl cyanide compound, the above-mentioned acrylonitrile, methacrylonitrile and α-chloroacyrlonitrile may, for example, be mentioned. Particularly preferred are acrylonitrile and/or methacrylonitrile.

Said other vinyl compound copolymerizable with the aromatic vinyl compound and the vinyl cyanide compound is preferably at least one member selected from the group consisting of various known vinyl compounds including, for example, acenaphthylene, fumaronitrile, maleimide, maleic anhydride, N-substituted maleimide, methacrylic acid, acrylic acid, a methacrylate, and an acrylate.

The rubber having a Tg of not higher than 0° C. to be used for the preparation of resin (B), may, for example, be a polymer of a conjugated diene compound such as butadiene or isoprene, or a copolymer thereof with other vinyl compound copolymerizable therewith. Particularly preferred is polybutadiene or a copolymer containing at least 50 wt % of butadiene. Preparation of the graft copolymer is carried out by a conventional method under known polymerization conditions.

In component (c) of the present invention, the weight ratio of the α-methylstyrene copolymer of resin (A) to the graft copolymer of resin (B) is preferably such that resin (A) is from 30 to 100 wt %, and resin (B) is from 0 to 70 wt %. Particularly preferably, resin (A) is from 50 to 100 wt %, and resin (B) is from 0 to 50 wt %. If resin (A) is less than 30 wt %, no substantial effect for improving heat resistance can be obtained.

The rigid portion (1) of the present invention has a deflection temperature under load within a range of from 80° to 120° C., more preferably at least 85° C., as measured by JIS K 7207 A-method. If the deflection temperature under load of the rigid portion (1) is less than 80° C., the degree of heat resistance will be inadequate, and the rigid portion is likely to deform when exposed to a high temperature atmosphere, such being undesirable.

In the present invention, the resin composition for the flexible portion (2) is a composition comprising a vinyl chloride resin, a partially crosslinked acrylonitrile-butadiene copolymer and a plasticizer. As the vinyl chloride resin to be used for the resin composition for the flexible portion (2) of the present invention, not only a polyvinyl chloride but also the one prepared by polymerizing a mixture of vinyl chloride with the above-mentioned vinyl compound copolymerizable therewith, by a conventional method such as suspension polymerization, bulk polymerization, fine suspension polymerization or emulsion polymerization, may all be used.

As the vinyl compound copolymerizable with vinyl chloride, the same as mentioned before may be used here. The amount of such a vinyl compound is also preferably within a range of at most 30 wt %, more preferably at most 20 wt %, in the constituting components for the vinyl chloride resin.

Further, the average degree of polymerization of the vinyl chloride is not particularly limited. However, in order to minimize the difference in the molding temperature from the rigid synthetic resin material in the case of co-extrusion and to meet the object of the present invention to obtain a good sealing material, the average degree of polymerization as measured in accordance with JIS K 6721 is preferably at least 2000.

With respect to the partially crosslinked acrylonitrile-butadiene copolymer to be used for the flexible portion of the present invention, a method for its preparation is not particularly limited, so long as it contains a crosslinked acrylonitrile-butadiene copolymer insoluble in methyl ethyl ketone. Any one of a method of obtaining it by copolymerization with a polyfunctional compound such as divinylbenzene or ethylene glycol dimethacrylate, a method of increasing the reaction rate until a crosslinked acrylonitrile-butadiene copolymer insoluble in methyl ethyl ketone will be formed, and a method of obtaining it by crosslinking a non-vulcanized acrylonitrile-butadiene copolymer by means of a small amount of a crosslinking agent, may be employed. Further, the acrylonitrile content in the crosslinked acrylonitrile-butadiene copolymer is preferably from 20 to 45 wt %.

As partially crosslinked acrylonitrile-butadiene copolymers which are commonly available, "Chemigum 83" tradename, manufactured by Goodyear Co., "JSR N201" tradename, manufactured by Japan Synthetic Rubber Co., Ltd. and "Hycar1421" tradename, manufactured by B. F. Goodrich Co., may, for example, be mentioned.

The plasticizer to be used for the flexible portion of the present invention is not particularly limited so long as it is useful as a plasticizer for a vinyl chloride resin. For example, phthalic acid type plasticizers such as dibutyl phathalate, diheptyl phthalate, di-2-ethylhexyl phthalate, diisononyl phthalate and diisodecyl phthalate, trimellitic acid type plasticizers such as tributyl trimellitate and tris-2-ethylhexyl trimellitate, pyromellitic acid plasticizers such as tetrabutyl pyromellitate and tetraoctyl pyromellitate, phosphoric acid type plasticizers such as tricresyl phosphate and trioctyl phosphate, fatty acid type plasticizers such as dioctyl adipate, dioctyl azelate and dioctyl sebacate, polyester type plasticizers such as adipic acid polyester and sebacic acid polyester and epoxy type plasticizers such as alkylepoxystearate, may, for example, be mentioned. These plasticizers may be used alone or in combination as a mixture of two or more of them. Among them, preferred is a phthalic acid ester, a trimellitic acid ester, a pyromellitic acid ester, an adipic acid ester or an epoxidized soybean oil. Further, a secondary plasticizer such as an epoxidized soybean oil or chlorinated paraffin may be incorporated.

The resin composition for the flexible portion comprises from 5 to 75 wt % of the vinyl chloride resin, from 5 to 70 wt % of the partially crosslinked acrylonitrile-butadiene copolymer and from 10 to 65 wt % of the plasticizer.

If the vinyl chloride resin is less than 5 wt %, a defect-forming phenomenon such as a defective appearance of the product is likely to occur during the extrusion molding. On the other hand, if it exceeds 75 wt %, the sealing portion of the sealing material thereby obtained tends to be hard, such being undesirable for a sealing material.

If the partially crosslinked acrylonitrile-butadiene copolymer is less than 5 wt %, the difference in the molding temperature from the rigid material during the co-extrusion molding tends to be large, and the sealing material thereby obtained tends to be susceptible to deformation by e.g. pressing pressure or compression. On the other hand, if it exceeds 70 wt %, a defect-forming phenomenon such as a defective appearance of the product is likely to occur during the extrusion molding.

Further, if the plasticizer is less than 10 wt %, the sealing portion of the obtained sealing material will be hard, such being undesirable for a sealing material. On the other hand, if it exceeds 65 wt %, the hardness tends to be too low, and the product tends to be susceptible to deformation in a high temperature atmosphere.

To the rigid portion (1) and the flexible portion (2) of the present invention, a filler may be added to improve the properties. In the case of the rigid portion (1), addition of the filler brings about a merit such that the heat resistance and the moldability will thereby be improved. As the filler, any filler which is useful for a vinyl chloride resin may be used. Specifically, calcium carbonate, silica, clay, talc, aluminum hydroxide and antimony oxide may, for example, be used alone or in combination. The average particle size of the filler is not particularly limited, but is usually from 0.01 μm to 10 μm, preferably from 0.03 μm to 7 μm, more preferably from 0.03 μm to 5 μm. Among fillers, calcium carbonate is preferred, particularly preferred is calcium carbonate having an average particle size of from 0.03 μm to 5 μm.

The amount of the filler incorporated to the resin or resin composition for the rigid portion (1) is usually at most 40 parts by weight, preferably from 1 to 30 parts by weight, per 100 parts by weight of the total amount of the resin or resin composition. If the filler exceeds 40 parts by weight, pelletizing tends to be difficult, and the performance as the resin composition can hardly be obtained.

Further, to the rigid portion (1) and the flexible portion (2) of the present invention, additives commonly employed for a vinyl chloride resin, such as a stabilizer, a processing assistant, a reinforcing agent, a lubricant, a pigment, etc. may be incorporated, as the case requires.

In the production of the product of the present invention, there is no particular restriction as to conditions for e.g. mixing and kneading of the materials for the rigid portion (1) and the flexible portion (2). Usually, for mixing and pelletizing, the same methods as employed for usual vinyl chloride resins, may be employed. For both the rigid portion (1) and the flexible portion (2), a mixing machine such as a ribbon blender or a high speed mixer such as a Henschel mixer or a super mixer is used for mixing. As a mixing mode, it is preferred that various components are charged into the above-mentioned mixing machine and uniformly blended for example at a temperature of not higher than 150° C. for a period of time suitable for the particular mixing machine.

Granulation can be carried out by a conventional method commonly employed for the production of a usual vinyl chloride resin composition by means of e.g. a Banbury mixer, a mixing roll or an extruder.

The co-extrusion apparatus is not particularly limited. However, it is usual to adopt a method wherein a knead-extruder A for the rigid material and a knead-extruder B for the flexible material are joined and unified by the same die C to obtain a co-extrusion apparatus D. Selection of the size, a single screw or twin screw, and a horizontal type or vertical type apparatus for each of the extruders A and B, may optionally suitably be selected depending upon the materials to be used, the shape and size of the product to be co-extruded, etc.

In the present invention, for the purpose of imparting an ornamental impression to the surface, an additional layer of e.g. a vinyl chloride resin or an acrylate resin may also be co-extruded on the surface at the time of the extrusion molding. Further, in order to improve e.g. the strength of the extruded product, a metal or the like may be co-extruded, as the case requires.

Now, the present invention will be described in further detail with reference to Examples. However, it should be understood that the present invention is by no means restricted to such specific Examples.

EXAMPLES 1 to 15

The starting materials for each of the rigid portion and the flexible portion, as identified in Tables 1 to 3, were put into a 75 l Henschel mixer and stirred and mixed, and then the mixture was kneaded and pelletized by a 90 m/m single screw extruder (manufactured by Ikegai Corp.) to obtain 15 kg of pellets of each of the thermoplastic resin composition and the flexible resin composition. Using these pellets, co-extrusion was carried out by using the following two extruders:

Extruder A: A 65 m/m single screw extruder (manufactured by Ikegai Corp.) (for the rigid portion (1))

Extruder B: A 45 m/m vertical single screw extruder (manufactured by Kabushiki Kaisha Plastic Kogaku Kenkyusho) (for the flexible portion (2))

The die for the extruded product used was the one designed to have structures for the rigid portion (1) and the flexible portion (2).

The obtained extruded product had excellent moldability. The product was cut into a length of 500 mm and heated for 48 hours in an atmosphere of 90° C. and 100° C. After withdrawal, the length L was measured and divided by the initial length of 500 mm to obtain a shrinkage ((500-L)/500×100)%. Further, the extruded product cut into a length of 500 mm was heated for 48 hours in an atmosphere of 90° C., whereupon evaluation of the appearance was made with respect to the deformation and warp. Further, the deflection temperature under load of the rigid portion (1) was measured in accordance with JIS K 7207 A-method. The physical properties thus evaluated are shown in Tables 1 to 3. As a result, the obtained extruded products were good and practically useful as sealing materials.

TABLE 1

| | | Examples | | | | | |
|---|---|---|---|---|---|---|---|
| | | 1 | 2 | 3 | 4 | 5 | 6 |
| Starting | Rigid portion (parts by weight) | | | | | | |
| materials | Component (a): Chlorinated vinyl chloride resin 1 | 30 | 40 | 54 | 27 | 50 | 47 |
| | Component (b): Vinyl chloride resin 1 | 20 | 10 | 13 | 40 | — | 12 |
| | Component (c): Resin (A) | 30 | 30 | 20 | 20 | 30 | 17 |
| | Resin (B) | 20 | 20 | 13 | 13 | 20 | 12 |
| | Filler | — | — | — | — | — | 12 |
| | Flexible portion (parts by weight) | | | | | | |
| | Vinyl chloride resin 2 | 50 | 50 | 50 | 50 | 50 | 50 |
| | NBR | 50 | 50 | 50 | 50 | 50 | 50 |
| | Plasticizer | 100 | 100 | 100 | 100 | 100 | 100 |
| Physical | Shrinkage (%) | | | | | | |
| properties | 90° C. × 48 hr | 0.17 | 0.14 | 0.18 | 0.52 | 0.01 | 0.17 |
| of | 100° C. × 48 hr | 0.58 | 0.48 | 0.57 | 1.33 | 0.32 | 0.50 |
| extruded | Deformation 90° C. × 400 hr (*1) | ○ | ○ | ○ | ○ | ○ | |
| products | Warp 90° C. × 400 hr (*2) | ○ | ○ | ○ | ○ | ○ | |
| | Deflection temperature under load of the rigid portion (°C.) | 99 | 108 | 101 | 97 | 110 | 102 |

(*1): Appearance of deformation ○: No change, ×: Deformation observed
(*2): Appearance of warp ○: No change, ×: Warp observed

TABLE 2

|  |  | Examples | | | |
|---|---|---|---|---|---|
|  |  | 7 | 8 | 9 | 10 |
| Starting materials | Rigid portion (parts by weight) | | | | |
|  | Chlorinated vinyl chloride resin 1 | 100 | 90 | — | 80 |
|  | Chlorinated vinyl chloride resin 2 | — | — | 70 | — |
|  | Vinyl chloride resin 1 | — | 10 | 30 | — |
|  | Filler | — | — | — | 20 |
|  | Flexible portion (parts by weight) | | | | |
|  | Vinyl chloride resin 2 | 50 | 50 | 50 | 50 |
|  | NBR | 50 | 50 | 50 | 50 |
|  | Plasticizer | 100 | 100 | 100 | 100 |
| Physical properties of extruded products | Shrinkage (%) | | | | |
|  | 90° C. × 48 hr | 0.01 | 0.01 | 0.01 | 0.01 |
|  | 100° C. × 48 hr | 0.30 | 0.73 | 1.04 | 0.30 |
|  | Deformation 90° C. × 400 hr (*1) | ○ | ○ | ○ | ○ |
|  | Warp 90° C. × 400 hr (*2) | ○ | ○ | ○ | ○ |
| Deflection temperature under load of the rigid portion (°C.) | | 110 | 109 | 109 | 108 |

(*1): Appearance of deformation  ○: No change, ×: Deformation observed
(*2): Appearance of warp  ○: No change, ×: Warp observed

TABLE 3

|  |  | Examples | | | | |
|---|---|---|---|---|---|---|
|  |  | 11 | 12 | 13 | 14 | 15 |
| Starting materials | Rigid portion (parts by weight) | | | | | |
|  | Component (b): Vinyl chloride resin 1 | 50 | 63 | 80 | 50 | 40 |
|  | Component (c): Resin (A) | 35 | 26 | 14 | 40 | 28 |
|  | Resin (B) | 15 | 11 | 6 | 10 | 12 |
|  | Filler | — | — | — | — | 20 |
|  | Flexible portion (parts by weight) | | | | | |
|  | Vinyl chloride resin 2 | 50 | 50 | 50 | 50 | 50 |
|  | NBR | 50 | 50 | 50 | 50 | 50 |
|  | Plasticizer | 100 | 100 | 100 | 100 | 100 |
| Physical properties of extruded products | Shrinkage (%) | | | | | |
|  | 90° C. × 48 hr | 0.02 | 0.20 | 1.24 | 0.01 | 0.02 |
|  | 100° C. × 48 hr | 0.25 | 1.99 | 4.94 | 0.08 | 0.24 |
|  | Deformation 90° C. × 400 hr (*1) | ○ | ○ | ○ | ○ | ○ |
|  | Warp 90° C. × 400 hr (*2) | ○ | ○ | ○ | ○ | ○ |
| Deflection temperature under load of the rigid portion (°C.) | | 93 | 89 | 85 | 95 | 96 |

(*1): Appearance of deformation  ○: No change, ×: Deformation observed
(*2): Appearance of warp  ○: No change, ×: Warp observed Comparative Examples 1 to 4

The starting materials for each of the rigid portion and the flexible portion, as identified in Table 4, was mixed, kneaded, pelletized and co-extruded in the same manner as in Example 1. The obtained extruded product was evaluated and measured, and the physical properties are shown in Table 4. As a result, the products were practically useless as sealing materials.

TABLE 4

|  |  | Comparative Examples | | | |
|---|---|---|---|---|---|
|  |  | 1 | 2 | 3 | 4 |
| Starting materials | Rigid portion (parts by weight) | | | | |
|  | Component (a): Chlorinated vinyl chloride resin 1 | — | 30 | 90 | — |
|  | Component (b): Vinyl chloride resin 1 | 100 | 20 | 10 | 50 |
|  | Component (c): Resin (A) | — | 30 | — | 35 |
|  | Resin (B) | — | 20 | — | 15 |
|  | Filler | — | — | — | — |
|  | Flexible portion (parts by weight) | | | | |
|  | Vinyl chloride resin 2 | 50 | 100 | 100 | 100 |
|  | NBR | 50 | — | — | — |
|  | Plasticizer | 100 | 70 | 70 | 70 |
| Physical properties extruded products | Shrinkage (%) | | | | |
|  | 90° C. × 48 hr | Large deformation | 0.25 | 0.05 | 0.02 |
|  | 100° C. × 48 hr | Large deformation | 0.78 | 1.16 | 0.32 |
|  | Deformation 90° C. × 400 hr (*1) | × | × | × | × |
|  | Warp 90° C. × 400 hr (*2) | × | × | × | × |
| Deflection temperature under load of the rigid portion (°C.) | | 75 | 99 | 109 | 93 |

(*1): Appearance of deformation  ○: No change, ×: Deformation observed
(*2): Appearance of warp  ○: No change, ×: Warp observed Starting materials used The starting materials used in Examples 1 to 15 and Comparative Examples 1 to 4 are as follows:

1) A chlorinated vinyl chloride resin for component (a)

Chlorinated vinyl chloride resin 1 Nikatemp T241 (chlorine content: 64.5 wt %), manufactured by Nippon Carbide Co., Ltd.

Chlorinated vinyl chloride resin 2 Nikatemp T281 (chlorine content: 67.8 wt %), manufactured by Nippon Carbide Co., Ltd.

2) A vinyl chloride resin for component (b)

Vinyl chloride resin 1 Denkavinyl SS110 (polymerization degree: 1100), manufactured by Denki Kagaku Kogyo K.K.

Vinyl chloride resin 2 Denkavinyl SH380 (polymerization degree: 3800), manufactured by Denki Kagaku Kogyo K.K.

3) A resin composition for component (c)

The proportions of resin (A) and resin (B) constituting component (c) in Examples 1 to 15 and Comparative Examples 1 to 4 are as shown in Tables 1 to 4.

An α-methylstyrene copolymer for resin (A) Using 210 g of α-methylstyrene, 15 g of styrene, 45 g of acrylonitrile and an initiator, emulsion polymerization was initiated. During the polymerization, 30 g of acrylonitrile was added, whereupon an α-methylstyrene copolymer was obtained.

A graft copolymer for resin (B) Using 286 parts of polybutadiene latex (polybutadiene solid concentration: 35%, average particle size: 350 μm, gel content: 87%) and an initiator, graft emulsion polymerization was carried out while adding 105 parts of styrene and 45 parts of acrylonitrile to obtain a graft copolymer.

4) A partially crosslinked acrylonitrile-butadiene copolymer (referred to as NBR in the Tables)

JSR N201, manufactured by Japan Synthetic Rubber Co., Ltd.

5) Plasticizer: Diisononyl phthalate

6) Filler: Surface treated calcium carbonate having an average particle size of 0.08 μm.

As described in the foregoing, according to the present invention, it is possible to obtain an extruded product excellent in the heat resistance, moldability and deformation resistance, specifically an excellent sealing material.

We claim:

1. An extruded product, comprising a rigid portion (1) and a flexible portion (2) which are co-extruded, wherein the rigid portion (1) is a resin composition, comprising:

i) from 90 to 10 wt % of the following component (a), ii) from 0 to 80 wt % of the following component (b), and iii) from 10 to 80 wt % of the following component (c);

Component (a) being a chlorinated vinyl chloride resin having a chlorine content of from 60 to 70 wt %, Component (b) being a vinyl chloride resin, and Component (c) being a resin or resin composition, comprising from 30 to 100 wt % of the following resin (A) and from 0 to 70 wt % of the following resin (B):

resin (A) being an α-methyl styrene copolymer, comprising from 65 to 85 wt % of α-methyl styrene, from 15 to 35 wt % of a vinyl cyanide compound, and from 0 to 20 wt % of another vinyl compound polymerizable therewith, resin (B) being a graft copolymer obtained by copolymerizing from 20 to 70 parts by weight of a mixture, comprising from 50 to 80 wt % of an aromatic vinyl compound, from 15 to 35 wt % of a vinyl cyanide compound, and from 0 to 30 wt % of another vinyl compound copolymerizable therewith, in the presence of from 30 to 80 parts by weight of a rubber having a glass transition temperature of not higher than 0° C.;

said resin or resin composition of said rigid portion (1) having a deflection temperature under load of from 80° to 120° C. as measured by JISK7207A-method; and the flexible portion (2) being made of a resin composition comprising from 5 to 75 wt % of a vinyl chloride resin, from 5 to 70 wt % of a partially crosslinked acrylonitrile-butadiene copolymer, and from 10 to 65 wt % of a plasticizer, said weight percentages being based on the total weight of the flexible portion.

2. The extruded product according to claim 1, wherein the vinyl compound copolymerizable with the α-methylstyrene and the vinyl cyanide in resin (A) is selected from the group consisting of styrene, vinyltoluene, t-butylstyrene, halogen-substituted styrene, acenaphthylene, fumaronitrile, maleimide, maleic anhydride, N-substituted maleimide, methacrylic acid, acrylic acid, methacrylate and acrylate.

3. The extruded product according to claim 1, wherein the vinyl compound copolymerizable with the aromatic vinyl compound and the vinyl cyamide in resin (B) is selected from the group consisting of styrene, vinyltoluene, t-butylstyrene, halogen-substituted styrene, acenaphthylene, fumaronitrile, maleimide, maleic anhydride, N-substituted maleimide, methacrylic acid, acrylic acid, methacrylate and acrylate.

4. The extruded product according to claim 3, wherein the vinyl compound copolymerizable with the aromatic vinyl compound and the vinyl chloride in resin (B) is styrene.

5. An extruded product, comprising a rigid portion (1) and a flexible portion (2) which are co-extruded, wherein the rigid portion (1) is a resin composition, comprising:

i) from 100 to 50 wt % of the following component (a), and ii) from 0 to 50 wt % of the following component (b), component (a) being a chlorinated vinyl chloride resin having a chlorine content of from 60 to 70 wt %, component (b) being a vinyl chloride resin, and said resin or resin composition of said rigid portion (1) having a deflection temperature under load of from 80° to 120° C. as measured by JISK7207A-method; and the flexible portion (2) being made of a resin composition comprising from 5 to 75 wt % of a vinyl chloride resin, from 5 to 70 wt % of a partially crosslinked acrylonitrile-butadiene copolymer, and from 10 to 65 wt % of a plasticizer, said weight percentages being based on the total weight of the flexible portion.

6. An extruded product, comprising a rigid portion (1) and a flexible portion (2) which are co-extruded, wherein the rigid portion (1) is a resin composition, comprising:

ii) from 90 to 20 wt % of the following component (b), and iii) from 10 to 80 wt % of the following component (c); component (b) being a vinyl chloride resin, and component (c) being a resin or resin composition, comprising form 30 to 100 wt % of the following resin (A) and from 0 to 70 wt % of the following resin (B);

resin (A) being an α-methyl styrene copolymer, comprising form 65 to 85 wt % of α-methyl styrene, from about 15 to 35 wt % of a vinyl cyanide compound, and from 0 to 20 wt % of another vinyl compound polymerizable therewith, resin (B) being a graft copolymer obtained by copolymerizing from 20 to 70 parts by weight of a mixture, comprising form 50 to 80 wt % of an aromatic vinyl compound, from 15 to 35 wt % of a vinyl cyanide compound, and from 0 to 30 wt % of another vinyl compound copolymerizable therewith, in the presence of from 30 to 80 parts by weight of a rubber having a glass transition temperature of not higher than 0° C.;

said resin or resin composition of said rigid portion (1) having a deflection temperature under load of from 80°to 120° C. as measure by JISK7207A-method; and the flexible portion (2) being made of a resin composition comprising from 5 to 75 wt % of a vinyl chloride resin, from 5 to 70 wt % of a partially crosslinked acrylonitrile-butadiene copolymer, and from 10 to 65 wt % of a plasticizer, said weight percentages being based on the total weight of the flexible portion.

7. The extruded product according to claim 6, wherein the vinyl compound copolymerizable with the α-methylstyrene and the vinyl cyanide in resin (A) is styrene.

8. The extruded product according to claim 6, wherein the rubber having a glass transition temperature of not higher than 0° C., used for the preparation of resin (B), is a polymer of butadiene or isoprene, or a copolymer thereof with another vinyl compound copolymerizable therewith.

9. The extruded product according to claim 8, wherein the rubber is polybutadiene or a copolymer containing at least 50 wt. % of butadiene monomer units.

10. The extruded product according to claim 1, 5 or 6 wherein the vinyl chloride resin for the rigid portion (1) has an average degree of polymerization of from 500 to 1500 as measured in accordance with JIS K 6721.

11. The extruded product according to claim 1, 5 or 6 wherein the vinyl chloride resin for the flexible portion (2) has an average degree of polymerization of at least 2000 as measured in accordance with JIS K 6721.

12. The extruded product according to claim 1, 5 or 6 wherein the rigid portion (1) contains at most 40 parts by weight of a filler per 100 parts by weight of the total amount of the resin or resin composition.

13. The extruded product according to claim 1, 5 or 6 wherein the partially crosslinked acrylonitrile-butadiene copolymer for the flexible portion (2) has an acrylonitrile content of from 20 to 45 wt %.

14. The extruded product according to claim 1, or 6 wherein the vinyl cyanide compound for component (c) is acrylonitrile.

15. The extruded product according to claim 1, 5 or 6 wherein the plasticizer for the flexible portion (2) is a plasticizer selected from the group consisting of a phthalic acid ester, a trimellitic acid ester, a pyromellitic acid ester, an adipic acid ester and epoxidized soybean oil.

* * * * *